United States Patent [19]

Eckel et al.

[11] Patent Number: 4,982,937
[45] Date of Patent: Jan. 8, 1991

[54] GAS-OPERATED SPRING

[75] Inventors: Hans-Gerd Eckel, Laudenbach; Willi Schweikert, Heidelberg, both of Fed. Rep. of Germany

[73] Assignee: Firma Carl Freudenberg, Weinheim/Bergstr., Fed. Rep. of Germany

[21] Appl. No.: 324,146

[22] Filed: Mar. 16, 1989

[30] Foreign Application Priority Data

Apr. 25, 1988 [DE] Fed. Rep. of Germany ....... 3813873

[51] Int. Cl.⁵ .......................... F16M 13/00; F16F 9/43
[52] U.S. Cl. .................................. 267/136; 267/64.28
[58] Field of Search ............... 267/64.15, 64.16, 64.28, 267/64.11, 136; 280/714, DIG. 1, 711, 707

[56] References Cited

U.S. PATENT DOCUMENTS

| | | | |
|---|---|---|---|
| 4,354,693 | 10/1982 | Maeda et al. | 280/DIG. 1 X |
| 4,462,610 | 7/1984 | Saito et al. | 280/714 X |
| 4,761,020 | 8/1988 | Eckel et al. | 280/714 |
| 4,826,141 | 5/1989 | Buma et al. | 280/DIG. 1 X |

*Primary Examiner*—Robert J. Oberleitner
*Attorney, Agent, or Firm*—Felfe & Lynch

[57] ABSTRACT

A gas-operated spring for the mutual support of two oscillating elements moving relative to one another, for which sensor-controlled (9, 10) first and second devices (1, 2) are provided, which bring about the blowing out of excess compressed gas from the gas-operated spring or the feeding in of additional compressed gas into the gas-operated spring (11) through the activation of valves (3, 4, 5). To prevent a mutual impairment of function, the first device (1) is active only for pressure changes of a frequency above a threshold value and the second device (2) only for changes in the mutual correspondence of the two elements (7, 8), which have a frequency below the threshold value.

10 Claims, 2 Drawing Sheets

1

GAS-OPERATED SPRING

BACKGROUND OF THE INVENTION

The invention relates to a gas-operated spring for the mutual support of two oscillating elements moving relative to one another. First and second sensor-controlled devices bring about the venting of excess gas from the spring or the feeding in of additional compressed gas to the spring through the activation of valves. The first device compensates for vibration induced pressure changes in the spring, and the second device compensates for changes in the relative position of elements supported by the spring. The function of the second device is cancelled by a frequency filter upon the introduction of vibrations with a frequency greater than 1 Hz.

Such a gas-operated spring is known from U.S. Pat. No. 4,761,020. It makes use of a frequency filter in order to prevent the functions of the two devices adversely affecting one another. The excess gas under pressure is blown out of the interior space into the atmosphere.

The first device which is provided to compensate for vibration-induced pressure changes in the gas-operated spring, may be used when a gas-operated spring is used in the area of the wheel support of a motor vehicle, where such changes in pressure can be caused by driving over a cobblestone pavement. They produce a change in the forces supporting the car body and become noticeable in the same in the form of humming vibrations. There is therefore the desire to compensate for corresponding pressure changes as completely as possible. From a technical point of view, the problems in this connection are largely solved, so that, with the present state of the art, it is possible even in such problem cases to ensure that the internal pressure of the gas-operated spring is largely kept constant at a particular level and in this way to prevent changes in the support forces exerted on the car body. Aside from the first devices described above, the previously known gas-operated springs have second devices, which are intended to ensure a constant relative position of the elements supported by the gas-operated spring.

They have a function opposite to that described above, inasmuch as, for example, the load-induced lowering of a vehicle can be compensated for only if additional compressed air is supplied to the gas-operated spring until the original level is regained. Automatically associated with this is a pressure increase in the gas-operated spring. At the same time, a deviation in pressure from the level originally present is selectively brought about. It is therefore entirely conceivable that the functions of the first and the second devices will adversely affect one another. For this reason, a frequency filter is connected upstream from the second device in the case of the gas-operated spring of U.S. Pat. No. 4,761,020. By means of this filter, the function of the second device is canceled in the event of positional changes in the supported object of a frequency greater than 1 Hz. This solution of the problem is still not very satisfactory for some technical applications.

SUMMARY OF THE INVENTION

It is an object of the invention to develop a gas-operated spring as described wherein independently of the particular application case, an optimum isolation of the supported body is assured at all times and, at the same time, an optimum relative position between the elements connected by the gas-operated spring.

For the inventive gas-operated spring, the first device is operative only in the case of vibration induced pressure changes above a threshold value and the second device only in the case of changes in the relative position of the two elements at a frequency below the same threshold value. The two devices thus each comprise a frequency filter, by means of which the effectiveness against one another is limited in such a manner, that a mutual effect or interference is completely excluded.

From vibrational points of view, the threshold value should advisably lie in the range between 0.1 and 0.5 Hz and preferably in the range between 0.25 and 0.35 Hz. The frequencies that are particularly relevant in vibration technology lie on either side of the given ranges. They comprise, on the one hand, higher frequency vibrations, which become disturbingly noticeable in downstream aggregates as so-called humming vibrations, and, on the other, lower frequency vibrations, which need to be controlled if migrational movements are to be avoided.

The first and the second device may have outputs, which are connected together at the input of a single servo inlet/outlet valve. An appropriate construction is distinguished by being obtainable particularly inexpensively.

According to a different refinement, provisions are made so that the first and second devices have outputs, which are connected with the respective input of separate servo inlet/outlet valves. In this case, the possibility arises of using different servo inlet/outlet valves in the two cases in view of the better possibility of adapting to the special circumstances of the application case.

It has proven to be particularly appropriate for each servo inlet/outlet valve used to have a flow rate, which is proportional to the magnitude of the actual pressure deviation or position deviation of the gas-operated spring or which can be changed by means of these supported elements. Such a construction has an improved effectiveness and the specific consumption of compressed gas is particularly low. Where the valves have separate inlet and outlet openings, the flow rate is determined by the diameter of the openings.

The servo inlet/outlet valve of the first device may have a maximum flow diameter, which is smaller than that of the servo inlet/outlet valve of the second device. Such a construction does justice to the frequent application, in which positional changes of the elements connected by the gas-operated spring must be compensated for much less frequently than vibrationally induced pressure changes in the gas-operated spring.

According to a different refinement of the invention, provisions are made so that the second device includes a sensor for extreme displacements of the two elements supported on one another by the gas-operated spring, so that the sensor is connected with the first device for the purpose of conducting signals and so that the first device can be inactivated by a signal from the sensor. Upon activation of this sensor, the gas-operated spring consequently behaves as a passive gas-operated spring as long as is required to eliminate the actual extreme displacement. The required return of the mutually supported elements accordingly takes place particularly quickly.

DETAILED DESCRIPTION

Figure 1:
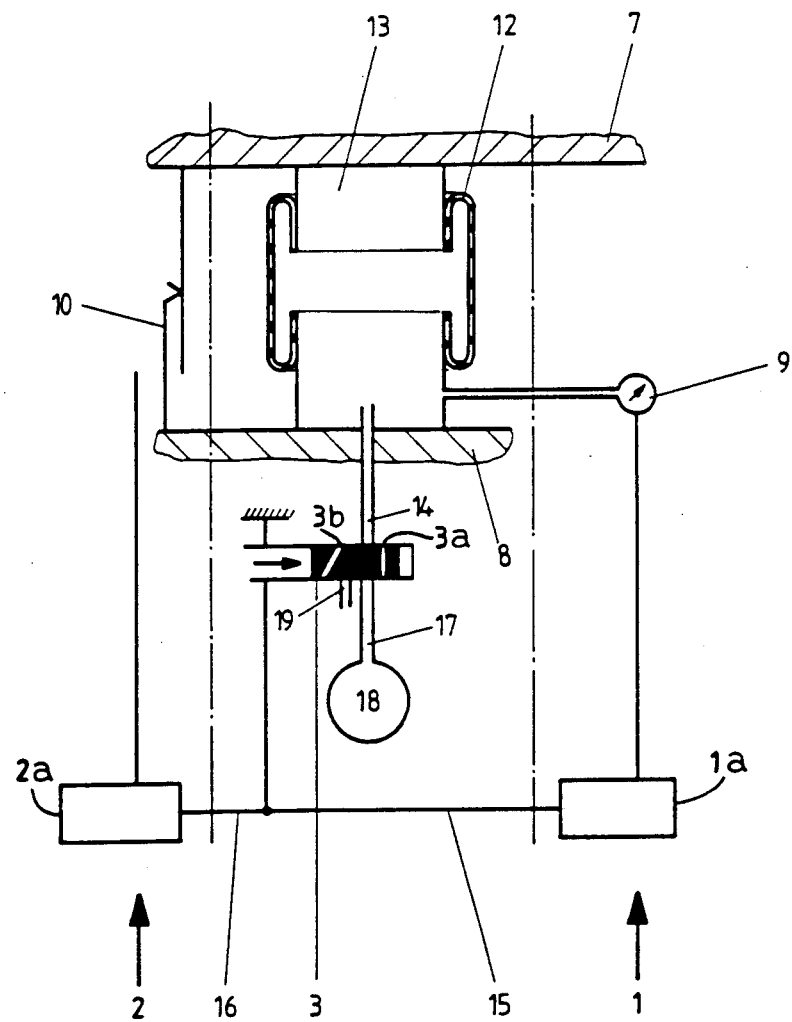
FIG. 1 shows a construction of the gas-operated spring, in which the signal outputs of the first and of the second device are connected with the signal input of a single servo inlet/outlet valve.

The gas-operated spring shown in FIG. 1 serves for the mutual support of two elements 7, 8, which can be moved relative to one another and which may be formed, for example, by the car body and the wheel steering mechanism of a motor vehicle. While in such an application the car body remains in a relative position of rest, the wheel steering mechanism is in a constant up and down motion depending on the time interval and the magnitude of the unevennesses in the roadway over which the vehicle is driving. The up and down motion is compensated for by appropriate deformations of the rubber bellows 12 of the gas-operated spring.

A pressure sensor 9, which forms a component of the first device 1, is connected with the interior space 13 of the gas-operated spring. For the rest, this device comprises a computer unit 1a, which is connected through a signal output 15 with the signal input of the servo inlet/outlet valve 3. The valve 3 has an inlet opening 3a and an outlet opening 3b.

Moreover, a measuring apparatus is disposed parallel to the gas-operated spring between the two elements 7, 8. This measuring apparatus 10 continuously detects relative shifts of the two elements 7, 8 and converts these shifts into a signal, which is fed to the computer unit of the second device 2. The signal output 16 of the computer unit 2a of the second device 2 is connected with the signal output 15 of the computer unit 1a of the first device 1 and, just as the latter, with the signal input of the servo inlet/outlet valve 3.

The servo valve 3 is connected through a pipeline 14 with the interior space 13 of the gas-operated spring and through a pipeline 17 with the compressed gas tank 18. Moreover, an outlet opening 19 is provided, which discharges into the atmosphere. An opening into the intake system of the compressed gas tank is also possible and makes unnecessary the continuous preparation of air, as well as the use of special measures to suppress intake and pressure-release noises.

As regards the functioning, the following description is based on the example indicated above, which relates to a use of the inventive gas-operated spring in the region of the support of the wheel-steering mechanism of a motor vehicle.

With the vehicle stopped and the interior space 13 of the gas-operated spring completely emptied, the computer unit 2a receives through the distance measuring device 10 of the two elements 7, 8 the signal that there is an extreme mutual approach of the elements 7, 8, as well as a vibrationless state. An output signal appears at the output of the computer unit 2a when the frequency of the relative positional changes of the elements 7, 8 is lower than 0.5 Hz. This is the case in the given situation. For this reason, the output signal appears and brings about a change in the switch position of the servo valve 3. The compressed gas tank 18 is hereby connected via opening 3a with the pipeline 14, which discharges into the interior space 13 of the gas-operated spring. This interior space 13 is filled with compressed gas until the two elements 7, 8 have moved apart so far, that the distance measuring device 10 shows a middle relative position and the output signal of the computer unit 2a is canceled.

The switching process described above cannot be affected by the computer unit 1a of the first device 1. This computer unit is acted upon by a signal of the pressure measuring device 9, which states first of all that there is no internal pressure in the interior space 13 of the gas-operated spring and that the gas-operated spring is in a vibration-free state. However, the output signal appears at the signal output of the computer unit 1a only when pressure changes of a frequency greater than 0.5 Hz occur. This is not the case in the given situation. The output signal consequently is blocked in this case. Interference with the output signal of the second computer unit 2a is therefore excluded.

During normal driving operations, vibrational position changes of element 8 in relation to element 7 occur. These result in very rapid pressure changes within the interior space 13 of the gas-operated spring. These rapid pressure changes are recorded continuously by the pressure measuring device 9 and fed to the computer unit 1a, where they bring about an adjustment of the servo valve 3 in proportion to the signal, so that the pressure changes within the interior space of the gas-operated spring are already picked up while they come into being by an appropriate activation of the servo valve 3, that is, by feeding in additional compressed gas into the interior space 13 of the gas-operated spring through inlet opening 3a or by letting an appropriate amount of compressed gas escape from the interior space 13 of the gas-operated spring through outlet opening 3b into the atmosphere. As a result, the pressure in the interior space 13 of the gas-operated spring remains largely constant and, to a correspondingly high degree, there is no change in the forces exerted by the gas-operated spring on the car body.

Figure 2:
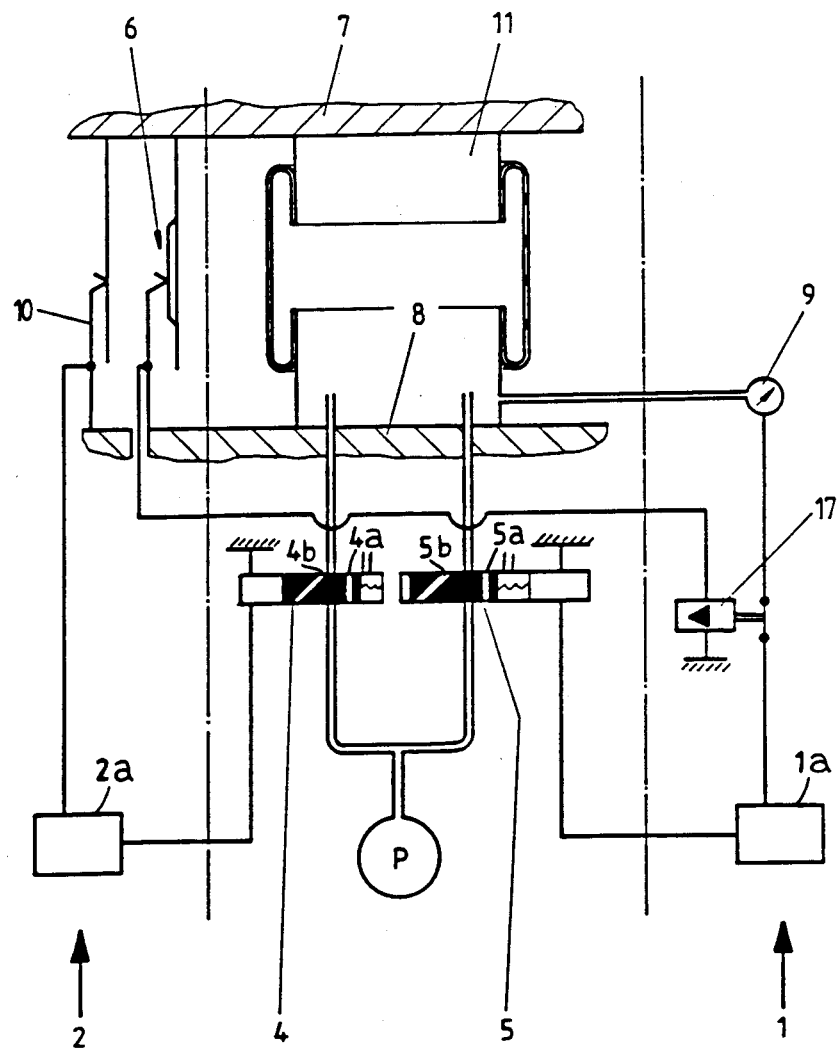
FIG. 2 shows a construction, in which the signal outputs of the first and second device each are connected with an independent servo inlet/outlet valve.

The version shown in FIG. 2 is similar from a structural point of view to the one above. In this case, however, two servo inlet-outlet valves 4, 5, which can be activated independently of one another, are used. They can be activated, on the one hand, by the computer unit 2a of the second device 2 and, on the other, by the computer unit 1a of the first device 1. In the embodiment shown, the valves 4, 5 have respective inlet openings 4a, 5a and respective outlet openings 4b, 5b. The diameter selected for these openings will control the flow rate to and from the spring.

Moreover, an additional sensor 6 is provided, which detects extreme shifts of the element 8 in relation to the element 7 and feeds these to a switching relay 17, by means of which the effectiveness of the computer unit 1a can be canceled.

The following can be said about the function of this version. The process commences initially with a mode of functioning, which is similar to the one described above. In addition, when the dynamic and the static load on the gas-operated spring are mutually superimposed, as is to be expected, for example, when driving a motor vehicle fast through a curve or when braking it quickly, the two servo inlet/outlet valves 4, 5 are activated independently of one another and optionally at the same time in order to ensure a very largely constant internal pressure in the gas-operated spring and an unchanging relative position of the elements 8 and 11. If extreme shifts nevertheless occur, the function of the computer unit 1a of the first device 1 is blocked by the output signal of the sensor 6. The gas-operated spring then behaves temporarily like a passive gas-operated spring in order to re-establish the original, average, relative position between the elements 7, 8 all the more quickly. By these means, sensor 6 is once again deactivated. The original overall function is again retained entirely.

We claim:

1. Apparatus for the mutual support of two oscillating elements moving relative to one another, said apparatus comprising a gas operated spring which supports the two elements relative to each other, valve means for admitting additional compressed gas into the gas operated spring and for releasing excess compressed gas from the spring, means for measuring the pressure in the gas operated spring and sending a signal representing said pressure, a first device which compensates for vibration induced pressure changes in the spring, said first device receiving said pressure signal and measuring the frequency of changes in said pressure, said first device being effective to actuate said valve means only for pressure changes of a frequency above a threshold value, and means for measuring the relative position of the two elements and sending a signal representing said relative position, a second device which compensates for changes in the relative position of the two elements, said second device receiving said relative position signal and measuring the frequency of changes in said relative position, said second device being effective to actuate said valve means only for changes in the relative position of a frequency below said threshold value.

2. The gas-operated spring of claim 1, characterized in that the threshold value for the frequency of the vibrations introduced lies at 0.1 to 0.5 Hz.

3. The gas-operated spring of claim 1, characterized in that the threshold value for the frequency of the vibrations introduced lies at 0.25 to 0.35 Hz.

4. The gas-operated spring of claim 1, characterized in that the first and second devices have signal outputs, which are connected together to a signal input of the valve means, which valve means comprises a single servo inlet/outlet valve.

5. The gas-operated spring of claim 4 wherein said servo inlet/outlet valve has an inlet opening and an outlet opening, the diameter of said openings determining the flow rate of the valve.

6. The gas-operated spring of claim 1, wherein the valve means comprises two servo inlet/outlet valves and the first and second devices have signal outputs, each of which is connected to a signal input of a separate servo inlet/outlet valve.

7. The gas-operated spring of claim 6, characterized in that the separate servo inlet/outlet valves each have a flow rate, which is changeable in proportion to the magnitude of the actual pressure/position deviation.

8. The gas-operated spring of claim 7 wherein each servo inlet/out valve has an inlet opening and an outlet opening, the diameter of said openings determining the flow rate of the respective valve.

9. The gas-operated spring of claim 6, characterized in that the servo inlet/outlet valve of the first device has a maximum flow rate, which is smaller than that of the servo inlet/outlet valve of the second device.

10. The gas-operated spring of claim 1, characterized in that the second device includes a sensor for extreme shifts of the two elements, that the sensor is connected with the first device for the purpose of conducting signals and that the first device can be inactivated by the signal of the sensor.

* * * * *